United States Patent [19]

Floyd et al.

[11] Patent Number: 5,116,890
[45] Date of Patent: * May 26, 1992

[54] NON-FORMALDEHYDE SELF-CROSSLINKING LATEX

[75] Inventors: William C. Floyd, Chester; Louis R. Dragner, Rock Hill, both of S.C.

[73] Assignee: Sequa Chemicals, Inc., Chester, S.C.

[*] Notice: The portion of the term of this patent subsequent to Jun. 25, 2008 has been disclaimed.

[21] Appl. No.: 718,500

[22] Filed: Jun. 20, 1991

Related U.S. Application Data

[63] Continuation-in-part of Ser. No. 371,493, Jun. 26, 1989, Pat. No. 5,026,746.

[51] Int. Cl.$^5$ .............. C08L 3/08; C08L 3/06; C08L 3/04
[52] U.S. Cl. ........................... 524/50; 524/47; 524/48; 524/49; 524/52; 524/53; 524/51
[58] Field of Search ............ 524/47, 48, 49, 50, 524/51, 52, 53

[56] References Cited

U.S. PATENT DOCUMENTS

| | | | |
|---|---|---|---|
| 3,061,471 | 10/1962 | Brockway et al. | 117/139.5 |
| 3,061,472 | 10/1962 | Brockway | 117/139.5 |
| 3,740,391 | 6/1973 | Williams et al. | 260/233.3 |
| 4,013,629 | 3/1977 | Cummisford et al. | 260/123.7 |
| 4,076,663 | 2/1978 | Masuda et al. | 260/17.4 |
| 4,322,322 | 3/1982 | Lambrechts | 524/734 |
| 4,455,416 | 6/1984 | Floyd et al. | 528/245 |
| 4,678,824 | 7/1987 | Lauria | 524/48 |
| 4,812,496 | 3/1989 | Leadbetter et al. | 524/47 |
| 5,026,746 | 6/1991 | Floyd et al. | 524/49 |

FOREIGN PATENT DOCUMENTS 0223145 5/1987 European Pat. Off.
2017124 10/1979 United Kingdom.

*Primary Examiner*—Paul R. Michl
*Assistant Examiner*—Peter Szekely
*Attorney, Agent, or Firm*—Mitchell D. Bittman

[57] ABSTRACT

A water-dispersible, self-crosslinking non-formaldehyde latex is prepared by reacting a starch-polymer graft with a glyoxal compound at temperatures of at least 70° C. to produce a stable emulsion with low viscosity and which upon drying and curing provides a film having good tensile, elongation, water resistance and anti-wicking properties.

31 Claims, No Drawings

NON-FORMALDEHYDE SELF-CROSSLINKING LATEX

This is a continuation-in-part of copending application Ser. No. 371,493, filed Jun. 26, 1989, now U.S. Pat. No. 5,026,746, issued Jun. 25, 1991.

BACKGROUND OF THE INVENTION

The present invention relates to a non-formaldehyde self-crosslinking latex and more particularly to a latex containing a starch-polymer graft modified by reacting with a glyoxal compound and having coatable viscosity, good storage stability and which provides a film having good tensile strength and elongation properties and which is suitable for use as a coating or a binder for non-woven fibers. This latex is water dispersible and stable in liquid form without the need of surfactants and upon drying and curing the starch is insolubilized and crosslinks providing good water resistance and wicking resistance.

Industrial starch may be utilized in a wide variety of applications including as coatings for paper or paper board. It desirably has good tensile and elongation properties, both under wet and dry conditions. Starch compositions may desirably be prepared in the form of coatable aqueous dispersions capable of being drawn down and cured on suitable substrates. The end user of these compositions may utilize them in a wide variety of applications by simply removing solvent to produce strong water resistant films.

A pre-gelatinized starch in liquid form would be desirable for certain end users as it would eliminate the need to handle dry starch and eliminate a cooking and dispersing step in the process. A problem with such pre-gelatinized starch is its stability over time. Because the product may spend many days in distribution and transportation, and because it sometimes is stored for a time prior to use at its ultimate destination, it is important that the product have a somewhat extended storage life wherein it maintains its desirable qualities and characteristics, particularly coatable viscosity. Prior art gelatinized starch products containing amylose tend to undergo a process known as retrogradation which results in the formation of a gel or precipitate. The viscosity also tends to thicken over time to a point which renders the products unusable for many commercial purposes. The problem is that by the time the pre-gelatinized starch product has been transported to its end user and prepared for use, it has often thickened to a point where it is no longer of a coatable viscosity. A preferred viscosity is about 350 centipoise or less. Viscosities above about 1000 centipoise are not readily flowable and are generally not usable in products such as coatings.

Non-woven fabrics cover a wide array of products. One of the non-woven bonding methods is to treat a staple or filament fiber sheet with an emulsion polymer containing a formaldehyde based crosslinking resin in order to impart water and solvent resistance. When the emulsion is dried and cured the polymer forms intimate bonding of the fibers. This polymer deposition modifies the strength, stiffness, environmental resistance, elongation and many other characteristics of the fiber fabric sheet. The fiber can be from a great variety of compositions, e.g. rayon, wood pulp (cellulose), cotton, nylon, polyester, glass and graphite. In the case of carded staple fiber the polymer usually contributes most of the strength and toughness character in the resulting non-woven. In wet-laid wood pulp fiber products the polymer is able to provide the non-woven strength and resistance to aqueous and solvent environments which the untreated non-woven would not have. In glass mat non-wovens traditionally bonded with a urea-formaldehyde resin, addition of emulsion polymers alters the toughness of the resulting non-woven. Even in filament or staple fiber non-wovens which are bonded by mechanical (i.e. needle punching) or thermal (e.g. spun bonded) techniques and are formed into useful non-woven fabrics without a chemical treatment, an additional application of an emulsion polymer can enhance or produce other valuable characteristics such as stretch resistance or non-slip character.

Melamine-formaldehyde resins do not build viscosity in the binder until cured, but they have the disadvantage of having an unpleasant odor and of releasing free formaldehyde. Curing with such resins involves the crosslinking of binder molecule with the methylol or methylated methylol group of the melamine resin. Free formaldehyde can be released either directly from the binder or mixture or when the coating is cured on the drying machine. The presence of even less than one percent of free formaldehyde, based on the total weight of the product, is undesirable, not only because of its objectionable odor, but because it is an allergen and an irritant, causing severe reactions in the operators who manufacture the binders and who treat and handle the non-woven fibers or fabrics.

The crosslinking of starches with multifunctional reagents which are reactive with starch hydroxyl groups is well known. Glyoxals and polyaldehyde compounds and resins have been previously utilized as crosslinkers. The simple mixing of glyoxal with a starch dispersion will provide a gel. U.S. Pat. No. 4,455,416 describes a paper coating containing starch binder and a cyclic urea/glyoxal/polyol condensate as an insolubilizer for the binder. As an insolubilizer the glyoxal condensate is inactive until the coating is applied and cured upon drying whereupon the glyoxal crosslinks the starch to impart water resistance. U.S. Pat. No. 3,740,391 describes the production of aqueous dispersions of a starch first reacted with an acrylamide and, subsequently, with glyoxal. U.S. Pat. No. 4,013,629 discloses a glyoxal binder system. U.S. Pat. No. 4,076,663 discloses a water absorbent resin prepared by polymerizing a polysaccharide with a water soluble monomer to which a crosslinking agent can be added during polymerization or to the reaction product. British Patent No. 2,017,124 discloses polysaccharides crosslinked with glyoxal. EPA 0223145 discloses emulsion polymerization of vinyl ester monomers in the presence of 1-10% of a hydrophobically-modified starch, wherein the emulsion may be crosslinked.

BRIEF DESCRIPTION OF THE INVENTION

It is an object of the present invention to provide a latex having low to moderate viscosity even at high solids content.

It is a further object of the invention to provide a latex having extended storage lives such that they maintain coatable viscosity over time.

It is a further object of the invention to provide a latex having improved film-forming properties.

It is another object of the invention to provide films having good wet and dry tensile strength and elongation properties.

It is another object of the invention to provide films which are resistant to water.

It is another object of the invention to provide binder for non-wovens without the presence of free formaldehyde.

These and other objects are achieved by providing a starch-polymer graft which has been reacted with a glyoxal compound at temperatures of at least 70° C. The glyoxal compound is effective in decreasing the viscosity of said dispersion relative to an analogous starch-polymer graft composition in the absence of any glyoxal compound. The starch-polymer graft contains a starch hydrolyzate having a water solubility greater than 50% at 25° C. and a polymer based on hydrophobic olefinically unsaturated monomers.

DETAILED DESCRIPTION OF THE INVENTION

A water dispersible, self-crosslinking non-formaldehyde latex is prepared which is readily flowable and wherein gelation and viscosity increases over time are inhibited. The latex is prepared by reacting an aqueous suspension or slurry of a starch-polymer graft with a glyoxal compound at temperatures of at least 70° C., preferably 85 to 95° C. The latex is rendered water-insoluble upon drying and curing and imparts superior room temperature tensile, elongation, water resistance and anti-wicking properties to a binder or coating. A unique feature of the starch-polymer graft latices is that they are compatible with gelatinized starch solutions. In contrast, conventional latexes tend to coagulate, separate or thicken when combined with starch. The latex also greatly reduce stretching of polyester fibers at 180° C.

The latex of this invention also provides a system which is compatible with an acrylic latex and provides a non-formaldehyde self-crosslinking resin with tensile strength equivalent to an all acrylic binder system but exhibiting less elongation and good water resistance. In addition, the latex system of this invention does not require or need a surfactant to provide a stable emulsion. In the latex system of this invention not only does the glyoxal compound when reacted in function as a latent crosslinker, it also unexpectedly improves the stability of the emulsion and its rheology.

It is theorized that by reacting the starch-polymer graft at the higher temperatures with glyoxal the amylose is derivatized with the glyoxal so that retrogradation of the amylose and the formation of amylose fatty acid complexes upon cooling is inhibited, resulting in aqueous dispersions having a flowable viscosity and in which gelation and viscosity increases over time are inhibited. Without intending to be bound by theory it is believed that the glyoxals react with amylose to make highly labile hemi-acetals which disrupt the crystallinity of amylose, thus significantly inhibiting retrogradation. Further, it is believed that glyoxal added after gelatinization and cool-down does not form hemi-acetals with the same efficiency as those added during heating because after gelatinization and cool-down crystallization occurs which limits the sites of reaction with glyoxal.

As used herein, the term "glyoxal compound" includes glyoxal but also derivatives thereof including blocked glyoxal resins. Suitable blocked glyoxal resins which may be used in accordance with the invention are described in U.S. Pat. No. 4,695,606 and include but are not limited to cyclic urea/glyoxal/polyol condensates, polyol/glyoxal condensates, urea or cyclic urea/glyoxal condensates and glycol/glyoxal condensates. The amount of glyoxal compound may be adjusted within broad limits, but is generally from about 0.5% to about 30%, preferably 3 to 15%, of the total dry weight of starch-polymer graft.

The particular starch-polymer graft is critical to the stability and other characteristics and properites of the latex. The starch is a hydrolyzate having a water solubility in excess of about 50% by weight at 25° C., preferably at least 70%, and a viscosity equivalent to a DE (Dextrose Equivalent) of less than 20, preferably less than 10 and preferably includes at least one graft site where at least one monomer is bound to said starch hydrolyzate to form a starch-polymer graft compound, wherein the number of graft sites per mole of starch is in excess of about 1 millimole, preferably at least 10 millimoles. The latex containing the starch-polymer graft provides a stable, fluid aqueous emulsion without the use of surfactants and contains small particles in which agglomeration, coagulation and precipitation is inhibited. In a preferred embodiment of this invention, maltodextrins, preferably maltodextrins having a dextrose equivalent of less than 10 are utilized as the starch hydrolyzate onto which one or more hydrophobic monomers are grafted.

The low molecular weight starch hydrolyzate suitable for use in this invention can be obtained from a variety of starches and starch derivatives. Suitable starches include corn, waxy corn, milo, white milo, wheat, potato and tapioca. A preferred starch source is waxy maize because of reduced levels of sedimentation. Starch derivatives that can be used to prepare suitable low molecular weight starch hydrolyzates include hydroxyethyl starch ether, starch acetate, starch phosphate, starch maleate, starch propionamide, cationic starch, oxidized starch and cyanoethyl starch and in particular, hydroxyethylated potato starch, cationic potato starch, acid modified corn starch, hydroxyethylated corn starch, oxidized corn starch, enzyme converted starch and mixtures thereof. However, the invention is not limited to these. Other derviatives are also applicable. Methods for the conversion of starch and starch derivatives to the low molecular weight starch hydrolyzates suitable for this invention are known in the art. They include acid, enzyme, oxidized, acid/enzyme, enzyme/enzyme converted starches and starch derivatives. Also included are certain dextrins (white dextrins, canary dextrins and British gums), thermochemically converted starches, and oxidized starches. Preferred starch conversion products are maltodextrins and dextrins. Generally the starch hydrolyzate prior to grafting has a cooked-out viscosity of less than 2000cps, preferably less than 1500cps, when measured at 40% solids and at room temperature with a Brookfield viscometer (#3 spindle, 100rpm).

Particularly preferred are maltodextrins that have a DE less than about 10. Commercial maltodextrins are usually refined so that all insoluble carbohydrates and non-carbohydrate materials are removed. These refined maltodextrins are particularly desirable since aqueous emulsions of the starch-polymer grafts are stable, remain fluid and can be stored several months without significant sediment settling. Certain highly converted dextrins have solubility and viscosity characteristics comparable to these maltodextrins, and may likewise serve as suitable grafting substrates, and may thus be considered as being functionally equivalent to these starch hydrolysates.

The monomer used in the grafting reaction to obtain a stable aqueous emulsion are hydrophobic olefinically unsaturated monomers and include but are not limited to vinyl monomers, acrylic monomers, styrene monomers, methacrylic monomers and mixtures of the foregoing. Hydrophobic monomers are generally those which have a solubility of less then 10 grams in 100 milliliters of water at 20°. For satisfactory aqueous emulsion stability generally at least 50%, preferably at least 85% by weight of the monomers are hydrophobic. Suitable hydrophobic monomers for making homopolymer or copolymer grafts include methyl acrylate, ethyl acrylate, propyl acrylate, butyl acrylate, 2-ethylhexyl acrylate, hydroxypropyl acrylate, methyl methacrylate, ethyl methacrylate, vinyl acetate and styrene and mixtures thereof. The monomer mix may contain hydrophilic monomers, preferably up to 15% by weight, of monomers such as acrylic acid, methacrylic acid, hydroxyethyl acrylate, acrylonitrile, quaternary salts of dimethylaminoethyl methacrylate, acrylamide and the like.

The ratio of polymer to starch (by weight) may be varied from about 1:50 to about 15:1, preferably from about 1:1 to about 7:1. Varying the polymer to starch ratio causes the properties of the resulting latex to vary greatly. Generally, high maltodextrin content, for example one having a monomer to maltodextrin ratio below about 2:1 produces a latex having low elongation. Low maltodextrin content, for example a ratio above about 5:1 produces a latex having higher elongation.

The starch-polymer graft may be prepared by methods known in the art, such as disclosed in U.S. Pat. Nos. 3,061,471 and 3,061,472. Suitable catalysts Which may be used in the grafting reaction include peroxidic catalysts which includes hydrogen peroxide, organic peroxides and hydroperoxides, sodium hypochlorite and persulfate salts such as potassium and ammonium persulfates and may also include ceric salts, preferably ceric ammonium nitrate.

The starch-polymer graft may be prepared by a single feed process whereby all of the monomer is charged to a starch solution, and catalyst is added slowly, preferably over a period of about 30 minutes to about 6 hours. Polymerization may also be accomplished by a dual feed process wherein monomer and catalyst are fed simultaneously into the starch solution over an extended period.

Preparation of the starch-polymer graft may be accomplished by charging water and an appropriate starch hydrolyzate into a reaction vessel. The initial solids content is preferably from about 20-50% by weight. In order to thoroughly disperse the starch hydrolyzate, the aqueous solution is preferably heated and stirred for a short period, preferably keeping the temperature below the boiling point of water. After the solution cools somewhat, the pH is adjusted and the vessel purged with an inert gas such as nitrogen. The monomers to be grafted are then charged into the reaction vessel. A catalyst solution is preferably added either subsequent to or substantially simultaneous with the addition of monomer.

Preferably, the catalyst comprises from about 0.1% to about 10% by weight of the monomer, most preferably from about 1% to about 4%. The catalyst solution is preferably added over a period of at least 30 minutes and preferably from about 1 to 3 hours. After all monomer and catalyst additions, and preferably after about $\frac{1}{2}$ to 2 hours of reaction time, a finishing catalyst may be added. Appropriate finishing catalysts include but are not limited to ferrous sulfate, t-butyl hydroperoxide, sodium bisulfite, ferrous ammonium sulfate, hydrogen peroxide and sodium formaldehyde sulfoxylate. The batch is then briefly heated to consume residual monomer, then cooled and neutralized.

The starch-polymer graft thus prepared advantageously will provide a fluid aqueous emulsion even at high solids contents of up to 30 to 50% without the use of surfactants. This starch-polymer graft emulsion may exhibit thixotropic behavior due to the starch. Reaction with a glyoxal compound will minimize this tendency, promoting a more stable rheology and providing for a non-formaldehyde crosslinking system. Agglomeration, coagulation and precipitation from the latex is minimal. Advantageously, the latex flows readily such that the viscosity is less than 1000cps, preferably less than 500cps and optimally less than 250cps as measured at 30% solids at 25° C. by a Brookfield viscometer (#3 spindle, 100rpm). Uniquely, the latex obtained exhibits a high surface tension typically of 50-55 dynes/cm$^2$, as opposed to 25-40 dynes/cm$^2$ for a typical vinyl or acrylic emulsion containing surfactant. The benefit of a high surface tension is that the binder containing the starch-polymer graft emulsion will stay on the surface rather than soaking the substrate and if penetration of the substrate is desired it can be controlled by judicious additions of penetrating agents. High surface tension also will inhibit wicking or rewetting.

Starch may be added to the latex in addition to the starch in the starch-polymer graft. This is a post graft starch which may be any of the known starches. Suitable starches may be obtained form any source including corn, waxy corn, red milo, white milo, wheat, potato and tapioca starches, but not limited thereto. Suitable starches for post addition to the starch-polymer graft in the latex include maltodextrins, dextrins and thin-boiling starches. Particularly suitable to this invention are thin-boiling starches that have been additionally chemically modified to reduce the setback or retrogradation tendencies of the starch. The prior art describes methods for making a wide variety of starch derivatives that display reduced setback. Because of low cost and effectiveness for reducing setback, preferably the starch is a thin-boiling starch derivative such as oxidized, enzyme converted, hydroxyethyl starch, starch phosphate, hydroxyethyl starch phosphate, starch acetate, starch propionamide and starch maleate. These derivatives may be used alone or in combination with thin-boiling starch, maltodextrins or dextrins to provide for a lower cost or to obtain desired viscosity characteristics. The post-graft starch is preferably a granular starch with greater film strength than the graft starch, due to a higher molecular weight. These higher molecular weight starches would generally precipitate when grafted thus necessitating their incorporation by post-addition.

In general, this post graft starch adds strength and minimizes elongation in products utilizing the binder. This starch should be compatible with the starch-polymer graft, have the ability to react readily with a glyoxal compound in a crosslinking reaction, and have a high fluidity. Unmodified starch is less desirable as the post graft starch due to its high viscosity. The post-graft starch may be included in the latex at levels up to 10 times the amount of starch-polymer graft. The range of about 5% to about 80% by weight of the starch-polymer graft is preferred.

Preferably, the glyoxal compound is added to the aqueous starch-polymer graft slurry and the slurry is heated to about 90° C. for at least about 30 minutes to react with the starch-polymer graft. The starch-polymer graft slurry and glyoxal compound may be heated briefly to higher temperatures such as those obtained with a steam injection cooker. The resulting latex composition may be treated with a biocide, preferably after it has been allowed to cool to about 60° C. The biocide may be added at a concentration by weight, of about 10ppm to about 500ppm. Suitable biocides include Kathon$^R$LX from Rohm & Haas which is a mixture of 5-chloro-2-methyl-4-isothiazolin-3-one and 2-methyl-4-isothiazolin-3-one and Proxel$^R$GXL from ICI which is 1,2 benzothiazolin-3-one. The reaction of the starch-polymer graft in the presence of glyoxal compounds preferably takes place in an aqueous slurry at a solids content between about 15% and about 50% by weight, preferably between about 25% and about 35%. In alternative methods, dry starch-polymer graft and dry glyoxal compounds may be intermixed prior to introduction into an aqueous slurry for the reaction steps.

Acrylamide and acrylamide copolymers can also be added to improve tensile strength of the starch films drawn down from these compositions. Generally the acrylamide polymer or acrylamide copolymer is added at a level of up to 500% by weight of the blocked glyoxal resin. The acrylamide is preferably a copolymer of acrylamide and methacrylic acid having a molar ratio of about 3 to 1.

The invention is further illustrated by the following examples which are set forth only as illustrations of the invention and not a limitations thereof.

EXAMPLE I

A starch-polymer graft with a 5:1 monomer:starch ratio is prepared as follows. To 450 g of deionized water, 75 g of a maltodextrin (Maltrin ®M040, having a dextrose equivalent of 5 and available from GPC, water solubility of 100% at 25° C.) was charged in a 2 liter resin kettle. This was heated to 65° C. to completely dissolve the maltodextrin, then cooled under nitrogen to 20° C. The pH was adjusted from 3.8 to 2.1 with 5 g of concentrated nitric acid. As a strong nitrogen sparge purged the maltodextrin solution, 178 g of ethyl acrylate, 178 g of methyl methacrylate, 19 g of butyl acrylate and 0.19 g of triallyl cyanurate were mixed together and charged to a 500 ml addition funnel. Fifteen grams of ceric ammonium nitrate were dissolved in deionized water and charged to a 150 ml addition funnel. With the kettle temperature at 20° C., the monomer mix and catalyst solution were added simultaneously over a 1½ hour period. A slight exotherm was controlled by the addition of small amounts of ice to the cooling bath. After 10 minutes of addition the reaction product was a white opaque emulsion in appearance. After completion of the addition, the reaction stirred for one hour. The pH was adjusted to 6.5 with 13 g of 25% sodium hydroxide. As a preservative, five drops of biocide were added. The resulting product was a white emulsion with a slight bluish cast. Viscosity (Brookfield viscometer, #2 spindle at 100rpm) at 45% solids and at room temperature was 80cps.

EXAMPLE II

A post graft starch and glyoxal compound where added to the starch-polymer graft and reacted as follows. A portion of the starch-polymer graft of Example I (200 g) was placed into a 500 ml, 3-necked flask followed by 14 g of an ethoxylated potato starch (Polaris Gum ®LV available from Penford Products), 50 g of water and 2 g of a cyclic urea/glyoxal condensate (Sequex®R, a 2:1 ratio of glyoxal to cyclic urea, 45% solids, available from Sequa Chemicals Inc.). The reaction was slowly stirred and heated to 90° C. for 50 minutes, then cooled. The blue sheen of the starch-polymer graft was no longer evident. The product was a white emulsion, 40% solids, with a viscosity of 80cps (Brookfield viscometer, #3 spindle at 100 rpm) at room temperature.

EXAMPLE III

A post graft starch and glyoxal compound were added to the starch-polymer graft and reacted as follows. A portion of the starch-polymer graft of Example I (200 g) was placed into a 500 ml flask followed by 28 g of Polaris Gum®LV, 75 g of water and 4 g of Sequex®R. The reaction was slowly stirred and heated to 90° C. for 30 minutes, then cooled. The product was a white emulsion, 40% solids, with a viscosity of 155cps (Brookfield viscometer, #3 spindle at 100rpm) at room temperature.

EXAMPLE IV

The samples prepared in Examples I–III were applied to a polyester fiber mat by drawing the mat through a pad bath at 15% solids followed by a nip roller, then dried and cured for 5 minutes at 350° F. and compared to a mat having a conventional acrylic latex binder (an emulsion copolymer of ethyl acrylate and n-methylol acrylamide containing surfactant). The results are shown below in Table I.

TABLE I

| | Ex. I | Ex. II | Ex. III | Acrylic Latex Binder |
|---|---|---|---|---|
| % add-on | 21.40 | 22.80 | 22.90 | 22.10 |
| Wicking (mm) | 2.00 | 3.00 | 3.00 | 5.00 |
| Tensile strength at ambient temp. (Kg) | 28.99 | 28.54 | 28.54 | 28.22 |
| Percent stretch at 180° C. under: | | | | |
| 5 Kg load | 6.46 | 2.62 | 2.55 | 3.44 |
| 8 Kg load | 17.70 | 6.99 | 6.31 | 9.03 |

As illustrated in Table I, the starch graft alone, i.e., the mat having the binder of Example I, had sufficient dry tensile and wicking resistance, but had insufficient resistance to high temperature stretch, when compared to the mat having a conventional acrylic latex binder. The mats having the binders of Examples II and III illustrate that the incorporation of a post-graft starch and glyoxal compound, greatly reduces the percent of stretch at high temperature. These formulations show superior performance compared to the conventional acrylic latex binder.

EXAMPLE V

The following binders were prepared in three runs (A–C) using the procedures of Examples I and II (all units of measure are the same as in Example I) with the acrylamide copolymer (a copolymer of acrylamide and methacrylic acid in a 3:1 molar ratio) and acid modified starch (Keofilm ®90, a 90 fluidity starch from Hubinger Company) being added with the cyclic urea/glyoxal condensate.

| Reactant | Run A | Run B | Run C |
|---|---|---|---|
| Maltodextrin | 5.7893 | 8.6840 | 7.3619 |
| Methyl Methacrylate | 7.0182 | — | 8.9244 |
| Ethyl Acrylate | 10.5215 | 26.3093 | 13.3794 |
| Triallyl Cyanurate | 0.0085 | 0.0128 | 0.0109 |
| Nitric Acid | 0.0714 | 0.1714 | 0.2180 |
| Ceric Ammonium Nitrate | 0.4858 | 0.7286 | 0.6177 |
| Sodium Hydroxide | 0.4000 | 0.4000 | 0.5087 |
| Ethoxylated Potato Starch | — | 8.6582 | — |
| Acid Modified Starch | 5.7722 | — | — |
| Acrylamide Copolymer | 0.3886 | 0.5829 | — |
| Cyclic Urea/Glyoxal Condensate (1:2 ratio) | 2.7376 | 4.1063 | — |
| Kathon ®LX (a biocide) | 0.0114 | 0.0114 | 0.0114 |
| Water | 66.6955 | 50.3351 | 68.9676 |
| Solids | 30 | 45.0 | 30 |
| Ratio of Monomer to Starch in Graft Starch | 3:1 | 3:1 | 3:1 |

The binder produced in runs A-C were also compared with a conventional acrylic latex binder as in Example IV. Mats using these binders were prepared as follows. A pad bath was prepared using each of the above binders at 15% solids. A polyester mat was padded in one dip and one nip, then dried and cured for 3.5 minutes at 400° F. (204° C.). Wet pick up was 145% to achieve an add-on level of 22%.

The following tests were completed on each treated polyester mat. Room temperature tensile strength was determined on an Instron M1130, and percent stretch at 5Kg and 8Kg was also determined. Stretch was determined at 180° C. in the environmental chamber of the Instrom Model 1130. Wicking was calculated by suspending a 15cm × 5cm sample of each mat vertically in 1 centimeter of blue-tinted water for 4 hours. The rise of color was measured. The results of these tests are tabulated below in Table II.

TABLE II

| | Mat Using Binder Of Run A | Mat Using Binder Of Run B | Mat Using Binder Of Run C | Mat Using Acrylic Latex Binder |
|---|---|---|---|---|
| Room Temperature Tensile Strength (Kg) | 29.03 | 28.09 | 28.25 | 28.22 |
| Percent Stretch at 180° C. under: | | | | |
| 5 Kg load | 2.146 | 2.381 | 5.720 | 3.436 |
| 8 Kg load | 5.373 | 8.121 | 17.090 | 9.027 |
| Wicking (mm) | 4.0 | 4.0 | 2.0 | 5.0 |

The binders of the present invention in Runs A and B as illustrated by the above Example and Table II, produced mats with high tensile strength at both room temperature and higher temperatures. These mats also show improved water resistance. Furthermore, because of its thermosetting, self-crosslinking properties, a nonformaldehyde alternative is provided to urea-formaldehyde, phenol-formaldehyde, or melamine-formaldehyde resins in certain application, for example, hot oil filters or adhesives for plywood and particle board. The binders are also useful in single ply, bitumen roofing materials. The binder of Run C had no post-graft starch or crosslinking agent and the results show the inferior properties.

EXAMPLE VI

To a 2-liter kettle was charged 500 g of deionized water and 468 g of a 40% solution of enzyme-converted oxidized starch, having a dextrose equivalent of 1 and a water solubility of 85% at 25° C. This was sparged with nitrogen and heated to 78° C. Styrene (12 g) and methyl methacrylate (28 g) were added all at once as an initial monomer charge, followed by 4 g of potassium persulfate in 112 g of water a initial catalyst.

A monomer mix consisting of styrene (322 g), methyl methacrylate (210 g) butyl acrylate (6 g) and bis-phenol A diepoxydiacrylate (5 g) was prepared as a neat mixture without surfactant or water. This was to be added by a magnetically driven pump. A second monomer, acrylamidoglycolic acid (6 g) was dissolved in 109 g of deionized water and added by syringe pump. The catalyst consisted of deionized water (109 g), potassium persulfate (4 g) and ammonium hydroxide (0.5 g) was added by a separate syringe along with the second monomer. Thirty minutes after the initial catalyst had been added, the monomer mixes and catalyst were added over a two hour period. The batch was maintained at 80° C. Ninety minutes after the delays had finished, a finishing catalyst was added consisting of potassium persulfate (2 g) in deionized water (40 g). After thirty minutes, the batch was cooled to 35° C. The pH was raised from 2.8 to 5.7 with 8.5 g of 20% ammonium hydroxide. The product was a white latex-like dispersion having 40% solids and an initial viscosity of 255 cps (Brookfield #3, at 100rpm).

This product designated Example VI was used as the source of material for subsequent crosslinker experiments detailed below. The viscosity of this product was monitored over a period of several days and is shown in Table III.

TABLE III

| Example VI visc., cps #3 @ 100 rpm | |
|---|---|
| initial | 255 |
| 24 h | 360 |
| 48 h | 470 |
| 72 h | 500 |
| 96 h | 495 |

EXAMPLE VII

Two types of starch crosslinking agents were selected: Polycup 1884 (a polyamide-polyamino epichlorohydrin reaction product sold by Hercules Inc., 4.9 g) and Epi-Rez W-55-5003 (an epoxy resin sold by Rhone-Poulenc, 3.9 g plus water, 1.2 g) were used with Example VI. One sample of each composition was heated with agitation to 90° C. for thirty minutes, then cooled.

The other sample of each was thoroughly mixed at room temperature and allowed to stand. The viscosity of the samples was monitored over the next several days. Formulations and viscosity are shown in Table IV. Viscosity, unless otherwise noted, was obtained using a Brookfield RV viscometer with a #3 spindle at 100rpm.

TABLE IV

| Example | A | B | C | D |
|---|---|---|---|---|
| Example VI (40%) | 150 | 150 | 150 | 150 |
| Polycup ®1884 (35%) | 4.9 | — | — | 4.9 |
| Epi-Rez ®W-55-5003 (57%) | — | 3.0 | 3.0 | — |
| Water | — | 1.2 | 1.2 | — |
| Heated | No | No | Yes | Yes |
| Vis. cps. | | | | |
| initial | 665 | 555 | 315 | 325 |
| 1 h | 730 | 560 | — | — |
| 2 h | 750 | 555 | 420 | 395 |
| 4 h | 800 | 585 | — | — |
| 20 h | 1600 (#3, 50 rpm) | 600 | 545 | 530 |
| 44 h | 3500 (#3, 20 rpm) | 630 | 625 | 630 |
| 68 h | — | 660 | 690 | 685 |

This data shows that these crosslinking agents are not compatible when mixed or reacted with starch-polymer grafts over an extended period of time. When the Polycup is mixed with the starch-polymer graft, it apparently readily reacts with the starch, crosslinking the particles, building viscosity. When the Polycup is reacted with the starch-polymer graft at elevated temperatures, much of the reactive azetidinium functionality is hydrolyzed by the water present before reacting with the starch. In comparing these viscosities to the viscosity of the unmodified latex of Example VI (see Table III), the rheology is worse in both cases.

The epoxy resin is reported to preferentially react with carboxylic acid functionality which is present in both the oxidized starch and the grafted polymer. When blended with the latex there is an initial thickening, and a gradual viscosity rise. When reacted in, it behaves in much the same way as the Polycup. It is likely some of the epoxy functionality is hydrolyzed by water at elevated temperatures. Again the rheology of these systems is worse than that of the unmodified latex of Example VI.

EXAMPLE VIII

In this example, the effects of glyoxal and a blocked glyoxal resin mixed with a starch-polymer graft are examined. The blocked glyoxal resin was Sequex ®R (a cyclic urea-glyoxal condensation product, 45% solids from Sequa Chemicals, Inc.). This resin contains 20% glyoxal equivalent on an "as is" basis.

Samples were prepared containing the latex of Example VI and glyoxal or blocked glyoxal resin at two levels. The latex was weighted into a 4 oz. jar followed by either glyoxal or glyoxal resin. The jar was then shaken vigorously for a minute to thoroughly mix. Since these starch-polymer grafts are thixotropic, and viscosity is thinned by shearing or mixing, a control containing no additives was also shaken and observed. Formulations and viscosity are shown in Table V. This data shows that the blocked glyoxal resin is more effective than glyoxal in reducing the viscosity of the latex than glyoxal when mixed together. More resin gives a lower viscosity than a lesser amount. The higher level of glyoxal, on the other hand, soon gives a viscosity similar to that of the control. A lesser amount gives only a slightly lower viscosity. Mixed in, glyoxal seems to have little effect on the viscosity in contrast to the resin.

TABLE V

| | A | B | C | D | E |
|---|---|---|---|---|---|
| Example VI | 110 | 110 | 110 | 110 | 110 |
| Sequex ® (45%) | 2.8 | — | 1.4 | — | — |
| Glyoxal (40%) | — | 2.8 | — | 1.4 | — |
| Visc. cps, | | | | | |
| initial | 255 | 270 | 285 | 290 | 340 |
| 1 h | 275 | 310 | 310 | 325 | 355 |
| 20 h | 300 | 385 | 330 | 365 | 380 |
| 44 h | 315 | 400 | 340 | 390 | 410 |

EXAMPLE IX

In this example, the effect of reacting glyoxal or a blocked glyoxal resin with a starch-polymer graft was examined. Glyoxal or a blocked glyoxal resin were reacted into the starch-polymer graft at two different levels. The latex was weighed into a 250ml flask followed by either glyoxal or resin, then heated to 90° C. for thirty minutes. After cooling, viscosity was monitored for several days. Formulations and viscosities are shown in Table VI.

TABLE VI

| | A | B | C | D | E |
|---|---|---|---|---|---|
| Example VI | 150 | 150 | 150 | 150 | 150 |
| Sequex ® | 3.8 | — | 1.9 | — | — |
| Glyoxal | — | 3.8 | — | 1.9 | — |
| Visc. cps, | | | | | |
| initial | 205 | 185 | 130 | 185 | 255 |
| 24 h | 280 | 193 | 195 | 245 | 360 |
| 48 h | 290 | 190 | 205 | 255 | 470 |
| 72 h | 310 | 200 | 255 | 265 | 500 |
| 96 h | 320 | 205 | 245 | 285 | 495 |

These results all show benefits acquired by reacting either glyoxal or blocked glyoxal resins into a starch-polymer graft latex. A means of reducing viscosity is desirable in that a higher solids product may be produced, or a more readily pumpable or sprayable product may be obtained. The viscosity of reacted products is significantly lower than that of mixed products, or untreated products.

The benefit of lower viscosity is quite unexpected with glyoxal, in view of prior art concerning use of glyoxal in starch-based paper coatings. Glyoxal was widely reported to give undesirable viscosity increases when used as an insolubilizer in all-starch or starch-latex paper coating formulations. Blocked glyoxal resins were introduced into paper coating formulations to lessen the viscosity rise seen with glyoxal. Neither were known to reduce a coating's viscosity. Also, in prior art, glyoxal and blocked glyoxal resins were mixed into coatings, not reacted in.

EXAMPLE X

To further illustrate the utility of this invention, the following examples show how use of a blocked glyoxal resin or glyoxal not only reduces viscosity, but provides a non-formaldehyde latent crosslinking system as well. These examples show how the crosslinked starch-polymer graft provides reduced stretch or elongation as well as tensile improvements.

A starch-polymer graft latex consisting of five parts polymer, one part starch was prepared by the following procedure. Deionized water (450 g) and a maltodextrin starch (D.E. 5, water solubility of 100% at 25° C., 75 g) were slurried in a 1 liter resin kettle and heated to 70° C. to dissolve the starch. This was cooled to 25° C. with a nitrogen sparge and pH adjusted from 4.3 to 2.0 with conc. HNO$_3$ (3.5G). Ceric ammonium nitrate (15 g) was dissolved in 100 g deionized water for the catalyst. Ethyl acrylate (197.5 g), methyl methacrylate (187.5 g) and triallyl cyanurate (TAC, 0.1875 g) were mixed for the monomer solution. The catalyst and monomer mixes were placed in separate addition funnels and added simultaneously over an 80 minute period. The batch was kept in a water bath and maintained below 30° C. by use of ice. After one hour, the pH was raised from 1.9 to 7.1 with 25% NaOH. A biocide was added. The product was 44% solids, a white emulsion with a slight blue sheen and had no grit.

This sample was padded onto non-woven polyester mat as the binder and compared to a conventional ethyl acrylate copolymer containing N-methylol acrylamide as the crosslinking agent. These binders were dried and cured for three minutes at 370° F., then tested for tensile and stretch. Results are shown in Table VII.

TABLE VII

|  | Starch Graft (Ex. X) | Conventional Acrylic |
|---|---|---|
| Tensile, Kg, 25° C. | 31.6 | 30.8 |
| 5 Kg stretch, 180° C., % | 18.1 | 6.7 |
| 8 Kg stretch, 180° C., % | 46.9 | 18.1 |

These results show that while tensile strength is adequate for the starch-polymer graft, its resistance to stretch at elevated temperatures is not satisfactory.

EXAMPLE XI

A product similar to that prepared in Example X was prepared. To 192 g of this product was added 28 g of Polaris Gum LV, (an ethylated potato starch from Penford Products), 10 g of Sequex ®R (cyclic urea-glyoxal condensation product from Sequa Chemicals, Inc.) and 70 g of water. This was heated to 90° C. for 30 minutes, then cooled. A white dispersion with a viscosity of 110 cps was obtained. This product was padded onto nonwoven polyester mat and compared to the same conventional acrylic binder as in Example X. Results are shown in Table VIII.

TABLE VIII

|  | Starch Graft (Ex. X) | Conventional Acrylic |
|---|---|---|
| Tensile, Kg, 25° C. | 29.3 | 28.2 |
| 5 Kg stretch, 180° C., % | 1.7 | 3.4 |
| 8 Kg stretch, 180° C., % | 4.3 | 9.0 |

The results show the benefit of incorporating a post graft starch and qlyoxal resin to a starch-polymer graft. The resin modifies the rheology and provides crosslinking. The tensile strength of the acrylic polymer is maintained, while the stretch (elongation) is greatly reduced. The binder prepared in Example XI is approximately half acrylic and half starch. This level of performance against a crosslinked acrylic is quite surprising. These improvements in performance are achieved economically and without use of formaldehyde.

EXAMPLE XII

A starch-polymer graft was prepared similar to that described in Example X except that an enzyme-converted starch was used, having a D.E. of 1.5 and water solubility of 85% at 25° C, and ammonium persulfate was used as a catalyst. The product obtained was a white latex-like dispersion having 39.1% solids, pH of 5.1 and viscosity of 180 cps. The ratio of polymer to starch was 3:1. To 1159.5 g of this product was added 19.4 g of Sequex R and 236.6 g of water. The batch was heated to 90° C. for 30 minutes and cooled. The pH was adjusted from 3.2 to 5.5 with aqueous ammonia. Solids were 32%. This latex was padded onto non-woven polyester mat as described previously and compared against a conventional acrylic polymer. This latex is similar to that described in Example X in that both have the same monomer composition. They differ only in initiator (cerium vs. persulfate), starch D.E. (5 vs. 1.5) use of blocked glyoxal resin (not used in Example X) and in polymer:starch ratio (5:1 vs. 3:1). The results show that while tensile is comparable, the use of the glyoxal resin greatly improves the stretch resistance when compared to that in Example X. Results are shown in Table IX.

TABLE IX

|  | Starch Graft (Ex. X) | Conventional Acrylic |
|---|---|---|
| Tensile, Kg, 25° C. | 25.15 | 27.14 |
| 5 Kg stretch, 180° C., % | 3.36 | 4.84 |
| 8 Kg stretch, 180° C., % | 8.81 | 13.57 |

EXAMPLE XIII

A latex was prepared as described in Example XII. This latex was for use as a fiberglass mat binder. After the glass fiber mat was formed, the latex was applied at approxpximately 20% add-on. The addition of an acrylamide-methacrylic acid copolymer was shown to greatly increase the tensile strength at room temperture, elevated temperatures and when wet. A cationic polyacrylamide was found to be less effective then the acrylamide-methacrylic acid copolymer, as shown in Table X. The formulations are listed as dry parts. The mat was cured for three (3) minutes at 400° F. Sample strips (1.5"×5") were tested on an Instron Model 1130.

TABLE X

|  | A | B | C | D |
|---|---|---|---|---|
| Latex of Example XII | 100 | 100 | 100 | 100 |
| Acrylamide/methacrylic acid copolymer |  | 5 |  | 3 |
| Cationic polyacrylamide |  |  | 5 | 3 |
| % Add-on | 23.7 | 23.9 | 21.5 | 24.0 |
| Hot tensile, 1' @ 400° F., Kg | 7.1 | 10.0 | 9.1 | 7.8 |
| Room temperature tensile, Kg | 27.7 | 35.0 | 30.1 | 32.1 |
| Hot Wet tensile, 1' immersion, 180° F., water, Kg | 1.4 | 10.9 | 5.8 | 7.5 |

While certain representative embodiments and details have been shown for the purpose of illustrating the invention, it will be apparent to those skilled in this art that various changes may be made therein without departing from the spirit or scope of the invention.

What is claimed is:

1. A water dispersible, self-crosslinking non-formaldehyde latex comprising:
   a starch-polymer graft comprising a starch hydrolyzate having a water solubility in excess of 50% by weight at 25° C. and a viscosity equivalent to a dextrose equivalent of less than 20, and a polymer based on a monomer which contains at least 50% by weight of a hydrophobic olefinically unsaturated monomer; and a glyoxal compound which has been reacted with the starch-polymer graft at temperatures of at least 70° C.

2. The latex of claim 1 wherein the amount of the glyoxal compound is within the range of about 0.5 to 30% of the dry weight of the starch-polymer graft.

3. The latex of claim 2 wherein said glyoxal compound is selected from the group consisting of glyoxal and a blocked glyoxal resin.

4. The latex of claim 2 wherein said glyoxal compound is a blocked glyoxal resin.

5. The latex of claim 4 wherein said blocked glyoxal resin is a cyclic urea/glyoxal condensate.

6. The latex of claim 4 wherein said blocked glyoxal resin is a cyclic urea/glyoxal/polyol condensate.

7. The latex of claim 4 wherein said blocked glyoxal resin is a polyol/glyoxal condensate.

8. The latex of claim 4 wherein said blocked glyoxal resin is a glycol/glyoxal condensate.

9. The latex of claim 1 wherein said starch hydrolyzate comprises dextrin or maltodextrin.

10. The latex of claim 1 wherein said starch hydrolyzate comprises a hydroxyethylated starch.

11. The latex of claim 1 wherein said starch hydrolyzate includes at least one millimole of graft sites per mole of starch hydrolyzate where the polymer is bound to said starch hydrolyzate to form the starch-polymer graft.

12. The latex of claim 10 wherein said hydroxyethylated starch is acid-modified and/or oxidized and/or enzyme converted.

13. The latex of claim 1 wherein said starch is selected from the group consisting of dextrin, maltodextrin, hydroxyethylated potato starch, cationic potato starch, acid modified corn starch, hydroxyethylated corn starch, oxidized corn starch, enzyme converted starch and mixtures of the foregoing.

14. The latex of claim 1 further comprising a polymer or copolymer of acrylamide.

15. The latex of claim 1, wherein the latex has no added surfactant.

16. The latex of claim 15 wherein the starch hydrolyzate has a water solubility in excess of 70%.

17. The latex of claim 16 wherein the starch hydrolyzate has a viscosity equivalent to a dextrose equivalent of less than 10.

18. The latex of claim 17 wherein the starch hydrolyzate is a maltodextrin.

19. The latex of claim 17 wherein the polymer is based on a monomer which contains at least 85% by weight of a hydrophobic, olefinically unsaturated monomer.

20. The latex of claim 19 wherein the hydrophobic monomer is selected from the group consisting of vinyl, acrylic, styrene and methacrylic monomers, and mixtures thereof.

21. The latex of claim 19 wherein the starch hydrolyzate includes at least 10 millimoles of graft sites per mole of starch hydrolyzate.

22. The latex of claim 21 wherein said starch hydrolyzate before grafting has a cooked-out viscosity of less than about 2000 centipoise in a room temperature aqueous solution at a solids content of 40% by weight.

23. The latex of claim 15 wherein the latex has a viscosity of less than 1000cps when measured at 30% solids, at room temperature and with a Brookfield viscometer with a #3 spindle at 100rpm.

24. The latex of claim 15 wherein the latex has a viscosity of less than 500cps when measured at 30% solids, at room temperature and with a Brookfield viscometer with a #3 spindle at 100rpm.

25. The latex of claim 19 wherein the latex has a viscosity of less than 250cps when measured at 30% solids, at room temperature and with a Brookfield viscometer with a #3 spindle at 100rpm.

26. The latex of claim 20 wherein the monomer is selected from the group consisting of methyl acrylate, ethyl acrylate, propyl acrylate, butyl acrylate, 2-ethylhexyl acrylate, hydroxypropyl acrylate, methyl methacrylate, ethyl methacrylate, vinyl acetate, styrene and mixtures thereof.

27. The latex of claim 14 wherein the copolymer is a copolymer of acrylamide and methacrylic acid.

28. The latex of claim 27 wherein the molar ratio of acrylamide to methacrylic acid is about 3 to about 1.

29. The latex of claim 2 wherein the ratio of polymer to starch in the starch-polymer graft is within the range from about 1:50 to 15:1.

30. The latex of claim 29 wherein the glyoxal compound is within the range of about 3 to 15% of the dry weight of the starch-polymer graft.

31. The latex of claim 1 further comprising adding a post graft starch to the latex.

* * * * *